(12) United States Patent  
Charriere

(10) Patent No.: US 8,457,963 B2
(45) Date of Patent: Jun. 4, 2013

(54) MECHANISM FOR PROVIDING USER GUIDANCE AND LATENCY CONCEALMENT FOR AUTOMATIC SPEECH RECOGNITION SYSTEMS

(75) Inventor: Laurent Charriere, Burlingame, CA (US)

(73) Assignee: Promptu Systems Corporation, Menlo Park, CA (US)

( * ) Notice: Subject to any disclaimer, the term of this patent is extended or adjusted under 35 U.S.C. 154(b) by 353 days.

(21) Appl. No.: 12/750,653

(22) Filed: Mar. 30, 2010

(65) Prior Publication Data

US 2010/0248786 A1 Sep. 30, 2010

Related U.S. Application Data

(60) Provisional application No. 61/165,412, filed on Mar. 31, 2009.

(51) Int. Cl.
*G10L 17/00* (2006.01)
*H04B 1/38* (2006.01)

(52) U.S. Cl.
USPC ......... 704/246; 704/231; 455/563; 455/412.1

(58) Field of Classification Search
USPC ............... 455/563, 412.1–413; 704/231, 243, 704/246–248, 251–253, 200, 258, 267, 270.1
See application file for complete search history.

(56) References Cited

U.S. PATENT DOCUMENTS

| 5,619,554 | A | * | 4/1997 | Hogan et al. | 379/88.1 |
| 6,098,043 | A | | 8/2000 | Forest et al. | |
| 6,408,272 | B1 | | 6/2002 | White et al. | |
| 7,657,285 | B2 | * | 2/2010 | Kawamoto | 455/556.1 |
| 2005/0185556 | A1 | * | 8/2005 | Oishi et al. | 369/53.37 |
| 2006/0259399 | A1 | * | 11/2006 | Mintz et al. | 705/37 |
| 2007/0054702 | A1 | * | 3/2007 | Rokusek et al. | 455/563 |
| 2007/0118375 | A1 | * | 5/2007 | Kenyon et al. | 704/237 |
| 2008/0259828 | A1 | * | 10/2008 | He et al. | 370/290 |
| 2009/0175425 | A1 | * | 7/2009 | Lee | 379/88.11 |
| 2010/0097239 | A1 | * | 4/2010 | Campbell et al. | 340/825.25 |

* cited by examiner

*Primary Examiner* — Allahyar Kasraian
(74) *Attorney, Agent, or Firm* — Gard & Kaslow LLP

(57) ABSTRACT

Audio input to a user device is captured in a buffer and played back to the user while being sent to and recognized by an automatic speech recognition (ASR) system. Overlapping the playback with the speech recognition processing masks a portion of the true latency of the ASR system thus improving the user's perception of the ASR system's responsiveness. Further, upon hearing the playback, the user is intuitively guided to self-correct for any defects in the captured audio.

16 Claims, 3 Drawing Sheets

MECHANISM FOR PROVIDING USER GUIDANCE AND LATENCY CONCEALMENT FOR AUTOMATIC SPEECH RECOGNITION SYSTEMS

CROSS-REFERENCE TO RELATED APPLICATIONS

This application claims the benefit of U.S. Provisional Patent Application No. 61/165,412 filed on Mar. 31, 2009 and entitled "Mechanism for Providing User Guidance and Latency Concealment for Automatic Speech Recognition Systems," which is incorporated herein by reference in its entirety.

BACKGROUND

1. Field of the Invention

The invention is in the field of automatic speech recognition, and more particularly to the accuracy and perceived responsiveness of automatic speech recognition systems.

2. Related Art

The ability for a user to control or interoperate with electronic machinery with the use of one's voice has been a longstanding objective. To this end, automatic speech recognition (ASR) systems, which convert digitized audio samples of the human voice into recognized text, have been developed. Despite the development of such systems, they are still not widely used as it is felt by many that their accuracy and responsiveness is inadequate.

Speech recognition accuracy is affected by an ASR system's ability to capture clear, complete and noise-free speech from a user. In general, ASR systems will not work well if the audio input is in some way defective or corrupted. Such defects or corruptions include: i) speech that is too soft (and therefore poorly transduced by a microphone), ii) speech that is too loud (and therefore subject to clipping or other non-linear distortions within the audio capture system), iii) lacking the start of an utterance (e.g., a user beginning to speak before pressing a push-to-talk button in an ASR system that requires such user interaction to start the audio capture), iv) lacking the end of an utterance (e.g., a user continuing to speak after releasing a push-to-talk button), and v) intrusion of either environmental or channel noise.

The responsiveness of an ASR system is likewise important because users can be impatient and they will not likely tolerate a system that they regard as sluggish. The metaphor for interaction with an ASR system is conversational, and users are conditioned by human conversation to expect a response within a few seconds of when a spoken command has been given. Unfortunately, ASR systems are not always able to respond this quickly, which leads to user dissatisfaction and abandonment of the product, application or service employing the ASR system.

What is needed, therefore, is an improvement in the accuracy and perceived responsiveness of ASR systems.

SUMMARY

A system and method for improved automatic speech recognition is shown and described herein with reference to a number of specific embodiments.

In one embodiment is an automatic speech recognition method comprising: receiving from a user of a mobile phone a signal to start capturing audio; begin capturing audio in a buffer of the mobile phone in response to the received signal to start capturing audio; receiving from the user of the mobile phone a signal to stop capturing audio; end capturing audio in the buffer of the mobile phone in response to the received signal to stop capturing audio; and performing the following steps in sequence: in a first step, begin sending the captured audio from the buffer of the mobile phone to an automatic speech recognition system of a server located across a network from the mobile phone; in a second step, begin playing back the captured audio from the buffer of the mobile phone; in a third step, receiving at the mobile phone a recognized version of the captured audio from the automatic speech recognition system of the server located across the network from the mobile phone; and in a fourth step, rendering at the mobile phone the recognized version of the captured audio.

In another embodiment is an apparatus comprising: a microphone configured to receive audio from a user of the mobile phone; a buffer configured to store the received audio; an utterance gating control configured to start and stop the buffer storing the received audio; a loudspeaker; a processor configured to perform the following steps in sequence: in a first step, begin sending the stored audio across a network to a automatic speech recognition system, in a second step, after waiting a predefined period of time after the utterance gating control has stopped the buffer storing the received audio, control playback of the stored audio through the loudspeaker; in a third step, receive across the network from the automatic speech recognition system a recognized version of the sent audio, and in a fourth step, render at the mobile phone the received recognized version of the sent audio.

In a still further embodiment is a computer readable storage medium having embodied thereon a program, the program executable by a processor to perform a method for automatic speech recognition, the method comprising: receiving from a user of a mobile phone a signal to start capturing audio; begin capturing audio in a buffer of the mobile phone in response to the received signal to start capturing audio; receiving from the user of the mobile phone a signal to stop capturing audio; end capturing audio in the buffer of the mobile phone in response to the received signal to stop capturing audio; and performing the following steps in sequence: in a first step, begin sending the captured audio from the buffer of the mobile phone to an automatic speech recognition system of a server located across a network from the mobile phone; in a second step, begin playing back the captured audio from the buffer of the mobile phone; in a third step, receiving at the mobile phone a recognized version of the captured audio from the automatic speech recognition system of the server located across the network from the mobile phone; and in a fourth step, rendering at the mobile phone the recognized version of the captured audio.

DETAILED DESCRIPTION

Speech recognition accuracy of an ASR system is affected by how well the system captures clear, complete and noise-free speech. Further, a user's satisfaction with and willingness to continue using an ASR system is related to the perceived responsiveness of the ASR system. Embodiments of the present invention implicitly guide the user of such an ASR system in capturing clear, complete and noise-free speech while also improving the perceived responsiveness, as is explained more fully herein.

In various embodiments of the present invention, a digitized user spoken audio utterance is captured in a buffer of a user device and transmitted to an ASR system for speech recognition. The resulting recognized speech is then transmitted back for rendering on the user device. However, unlike prior approaches, the buffer captured. audio is played back by the user device while it is being recognized by the ASR system. This playback of the captured audio serves at least two purposes.

One purpose of playing back the captured audio is to mask some or all of the true latency of the speech recognition process which, as explained elsewhere herein, is the period of time between the end of capturing the spoken audio utterance and whenever the recognized audio is rendered to the user. As a result, the user instead perceives a comparatively shorter apparent latency which is the time between the end of the audio playback and the rendering of the recognized audio. The difference in time between the true latency, and the apparent latency, as explained more fully elsewhere herein, is referred to herein as the masked latency.

Another purpose of playing back the captured audio is to provide the user with an opportunity to hear the captured audio and thereby implicitly provide the user guidance in how to improve the quality of a subsequent audio capture. Upon hearing playback of the captured audio, a user will be immediately informed if the spoken audio utterance was too quiet, too loud, clipped on either end, or included some noise, among other possible defects.

Figure 1:
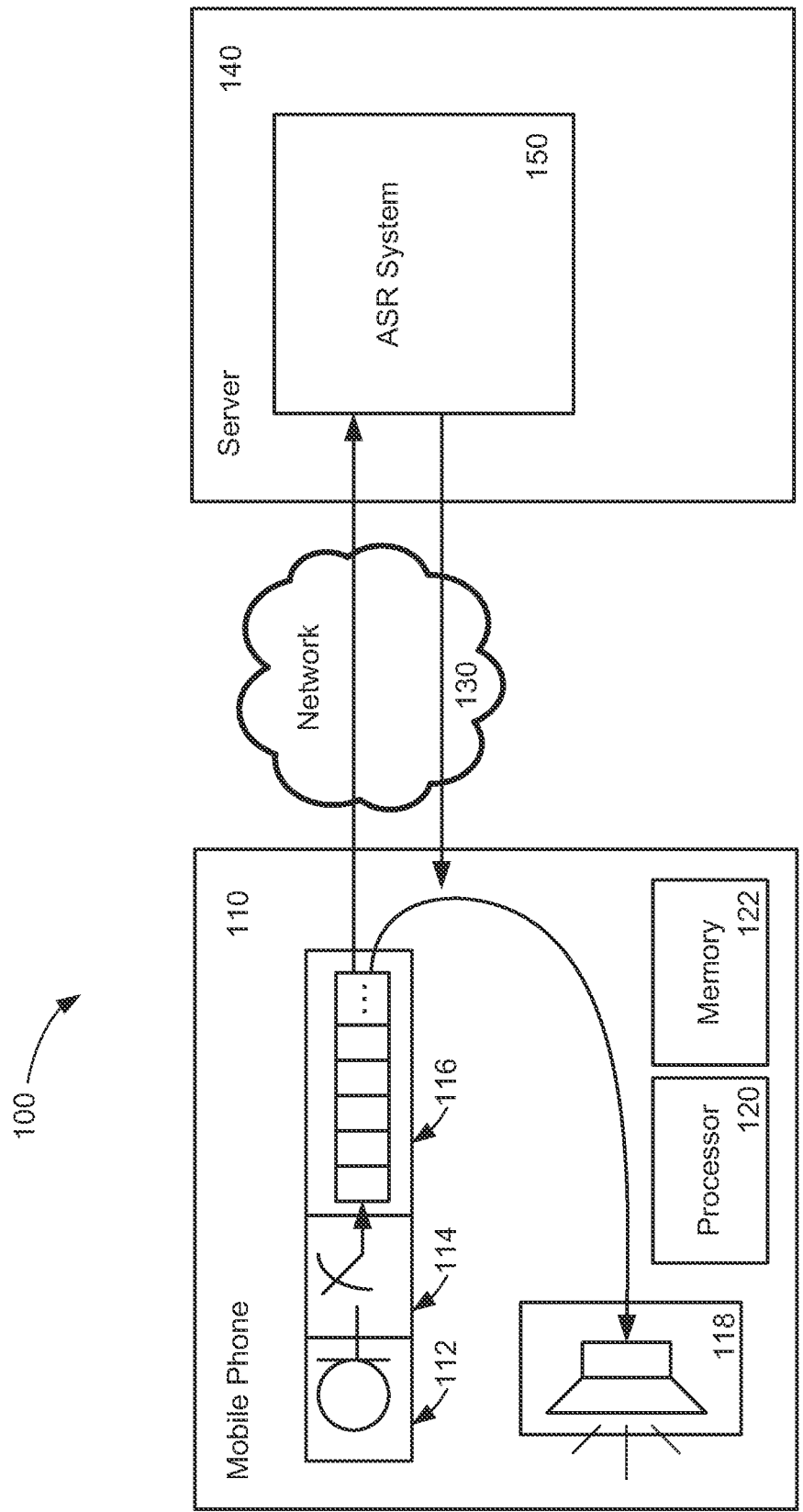
FIG. 1 is a block diagram of one embodiment of the present invention in operation.

Referring now to FIG. 1, a block diagram of one embodiment of the present. invention in operation can be seen. Shown in this block diagram is an exemplary user device, such as a mobile phone 110, including a microphone 112, an utterance gating control 114, a buffer 116, a loudspeaker 118, a processor 120 and a memory 122. As also shown, mobile phone 110 is in communication across network 130 with a server 140 which includes ASR system 150.

Processor 120, which can be any known processing unit, handles the various described processing functions of mobile phone 110 along with memory 122 according to programmatic instructions of an operating system and/or appropriate application programs. Memory 122 can be working memory for processor 120 or can be a computer readable storage medium for storing the instructions for the described functions.

In operation, a user of mobile phone 110 speaks an audio utterance into microphone 112. Utterance gating control 114, which in one embodiment is a push-to-talk button of mobile phone 110, controls when buffer 116 begins and ends capturing a digitized for n of the spoken audio utterance. In this way, for example, any portion of the spoken audio utterance occurring between the user pressing and releasing the push-to-talk button is captured or stored in buffer 116.

Shortly after having been captured in buffer 116, the captured audio stored in buffer 116 is then played back via loudspeaker 118. This period of time between when buffer 116 ends capturing the audio and when loudspeaker 118 begins playing back the captured audio is referred to herein as the "turnaround interval," which in one embodiment is approximately 100 milliseconds.

The captured audio stored m buffer 116 is also sent across network 130 to server 140 for processing by ASR system 150. In one embodiment sending the captured audio begins to occur while buffer 116 is still capturing the audio utterance. In another embodiment sending the captured audio occurs immediately after buffer 116 ends capturing the audio. In still another embodiment sending the captured audio occurs sometime after buffer 116 ends capturing the audio.

Upon receipt of some or all of the sent audio, ASR system 150 performs speech recognition processing on the sent audio. As is known in the art, speech recognition results in the creation of a recognized version of the sent audio in the form of a transcription and/or associated symbolic meaning. This recognized version of the sent audio is then sent back across network 130 to mobile phone 110 where it is rendered on mobile phone 110. Rendering the recognized version on mobile phone 110 is accomplished by the recognized version being displayed on a display (not shown) of mobile phone 110 or by mobile phone 110 performing some action based on the recognized version thus providing a visible indication to the user of mobile phone 110.

The above sequence of events from the perspective of the user of mobile phone 110 will now be reviewed. The user presses a push-to-talk button on mobile phone 110 to start capture of a spoken audio utterance by buffer 116. The user releases the push-to-talk button on mobile phone 110 to end capture of the spoken audio utterance by buffer 116. After a relatively short period of time known as the turnaround interval, the captured audio from buffer 116 is played back through loudspeaker 118 of mobile phone 110. After a bit longer period of time, the recognized version of the audio (having been created by ASR system 150 and sent back to mobile phone 110) is rendered On mobile phone 110.

As explained above, the apparent latency between the end of playing back the captured audio and the rendering of the recognized audio is less than the true latency between the end of capturing the audio and rendering of the recognized audio. This difference is the masked latency which improves the user's perception of the responsiveness of the system.

Further, as also explained above, playing back the captured audio provides the user with an opportunity to correct for defects in the captured audio.

Figure 2:
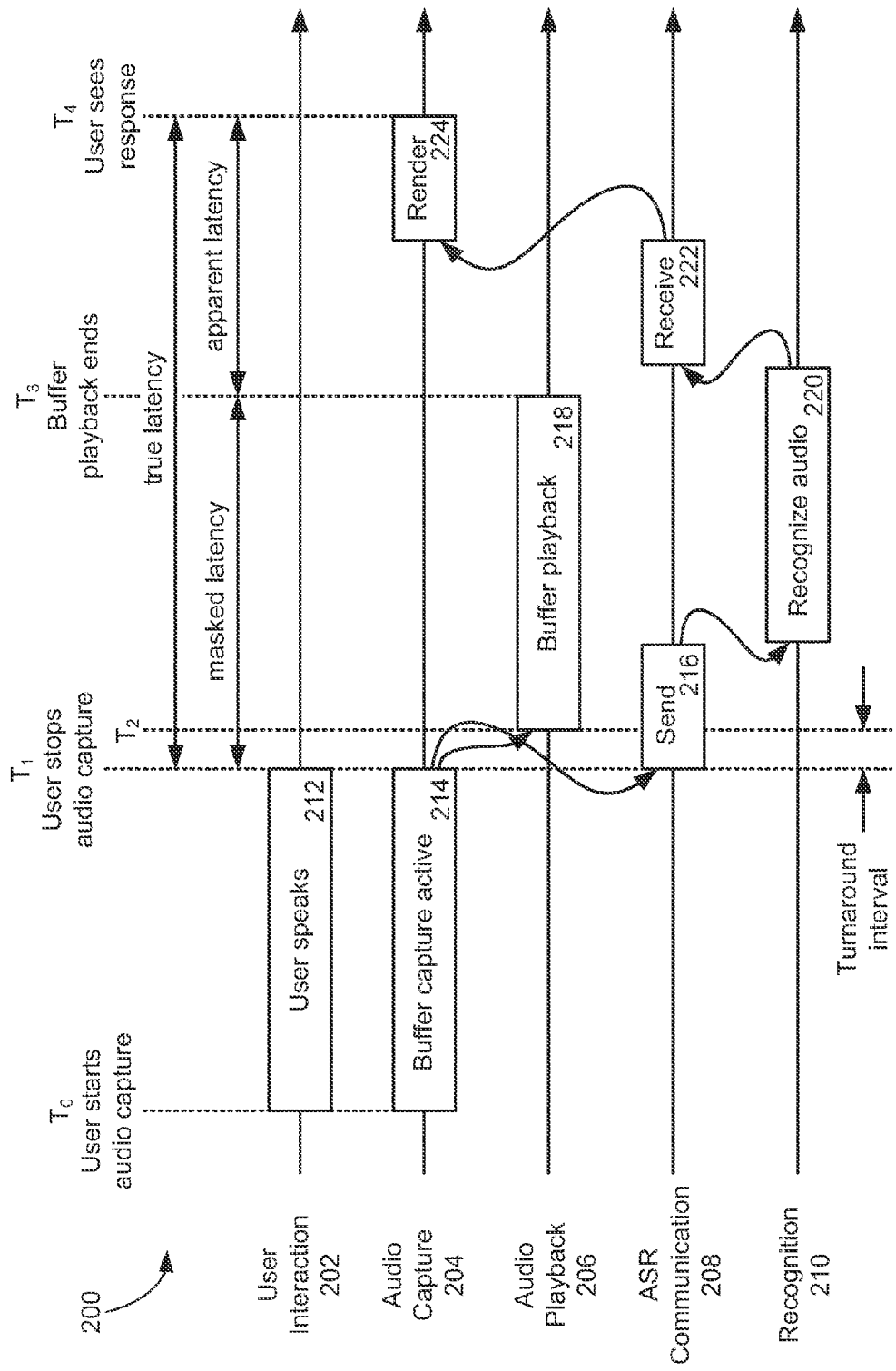
FIG. 2 is timing diagram of one embodiment of the present invention.

Referring now to FIG. 2, a timing diagram of one embodiment of the present invention can be seen.

A user interaction timeline 202 is shown depicting a user's spoken audio utterance as "user speaks" 212 between time $T_0$ and time $T_1$. This is, for example, a user speaking into microphone 112 of mobile phone 110, as was described with reference to FIG. 1.

An audio capture timeline 204 is shown depicting the spoken audio utterance being captured by a buffer as "buffer capture active" 214 between time $T_0$ and time $T_1$. This is, for example, buffer 116 capturing the user's spoken utterance between the time the user starts the audio capture at time $T_0$ (e.g., the user pressing a push-to-talk button at time $T_0$, thus triggering the beginning of buffer 116 capturing the audio utterance), and the user stopping the audio capture at time $T_1$ (e.g., the user releasing the push-to-talk button at time $T_1$, thus triggering the ending of buffer 116 capturing the audio utterance), as was described with reference to FIG. 1.

An audio playback timeline 206 is shown depicting the buffer playing back the captured audio as "buffer playback" 218 between time $T_2$ and time $T_3$. This is, for example, loudspeaker 118 of mobile phone 110 playing back the audio captured by buffer 116, as was described with reference to FIG. 1, As is also shown in the figure, the turnaround interval is the period of time between time $T_1$, when the buffer has ended capturing the audio utterance, and time $T_2$, when the audio playback from the buffer begins.

An ASR communication timeline 208 is shown depicting the transmission of the captured audio to an ASR system as "send" 216, which is shown in this example as starting at time $T_1$, the end of the buffer capturing the spoken audio utterance. This is, for example, the spoken audio utterance once captured in buffer 116 being sent from mobile phone 110 across network 130 to ASR system 150 of server 140, as was described with reference to FIG. 1.

A recognition timeline 210 is shown depicting an ASR system performing a speech recognition function on the received audio as "recognize audio" 220. This is, for example, ASR system 150 of server 140 performing speech recognition processing on the received audio to create a recognized form of the audio, as was described with reference to FIG. 1.

ASR communication timeline 208 is also shown depicting the transmission of the recognized form of the audio from the ASR system to the mobile device as "receive" 227. This is, for example, ASR system 150 and/or server 140 sending the recognized form of the audio across network 130 to mobile phone 110, as was described with reference to FIG. 1.

Audio capture timeline 204 is also shown depicting the display or user visible action on the mobile device based on the received recognized form of the audio depicted as "render" 224. This is, for example, mobile phone 110 displaying the recognized speech as text on a display of mobile phone 110 or by mobile phone 110 performing some action visible to the user of mobile phone 110 based on the recognized speech, as was described with reference to FIG. 1.

Also shown labeled in the figure are the various latencies previously described. The "true latency" is shown as the period of time between time $T_1$, when the user has stopped the audio capture, and time $T_4$, when the user can see the rendered recognized speech. The "apparent latency" is shown as the period of time between time $T_3$, when the buffer has finished playing back the captured audio, and time $T_4$, when the user can see the rendered recognized speech. Lastly, the "masked latency" is shown as the period of time between time $T_1$, when the user has stopped the audio capture, and time $T_3$, when the buffer has finished playing back the captured audio.

Reviewing these various latencies highlights the difference between the present approach and prior approaches. As previously explained, in the present approach the user has an opportunity to hear the audio playback after the turnaround interval and during some portion of the true latency period. This audio playback can thus overlap some or all of the time spent by the ASR system in performing the speech recognition processing such that the only apparent delay until the user can see the response at time $T_4$ is that which occurs after the audio playback at time $T_3$ rather than after conclusion of the audio capture at time $T_1$ as is the case with prior approaches. Stated differently, the user typically does not experience the playback as time spent waiting for the speech recognition and, instead, perceives the speech recognition latency to be only the period of time from the end of the playback to the rendering of the recognition result, namely, the apparent latency. It is to be understood that the longer the turnaround interval the longer is the apparent latency and the more the true latency is masked by the masked latency.

As also previously explained, the audio playback of the present approach further benefits the user who can hear any incomplete audio captures, inaudible speech utterances, problematic background noise levels, etc. Such a user, upon hearing the audio playback having any such defects, will have a lessened expectation about how well the ASR system will correctly recognize the spoken utterance. And the user intuitively grasps that the audio is being played back for diagnostic purposes and can adjust their behavior appropriately, as needed.

In this way, the user has an opportunity to self-correct for audio input errors such as speech that is too soft (as evident, for example, by a low volume audio playback), speech that is too loud (as evident, for example, by clipping or other non-linear distortions of the audio playback), the user starting the audio capture after the beginning of the spoken audio utterance (as evident, for example, by the audio playback missing the beginning of the audio utterance), the user stopping the audio capture before the end of the spoken audio utterance (as evident, for example, by the audio playback missing the end of the audio utterance), and intrusion of either environmental or channel noise (as evident, for example, by less than desirable audible noise in the audio playback). Such a user can repeat the audio capture in an attempt to resolve the perceived audio input error by, for example and as appropriate for the given situation, speaking more loudly, speaking more quietly, pressing the push-to-talk button before beginning the spoken audio utterance, releasing the push-to-talk button after ending the spoken audio utterance, moving away from or waiting until the environmental noise has stopped, or simply repeating the process in the hopes that the channel noise of the first attempt was simply spurious.

Figure 3:
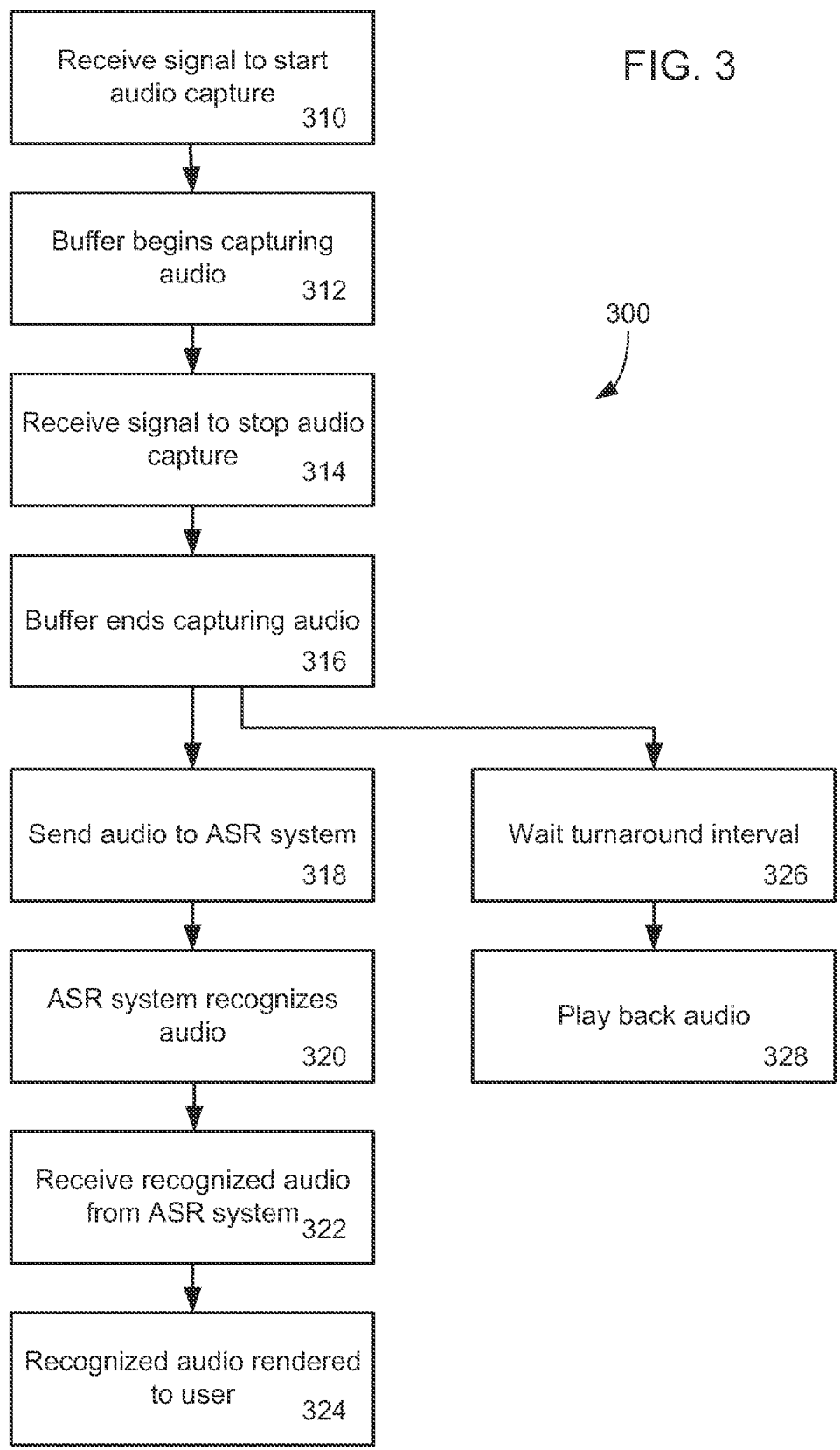
FIG. 3 is a flowchart of a general overview of one embodiment of the present method.

Referring now to FIG. 3, which is a flowchart of a general overview of one embodiment of the present method.

In step 310, a signal is received to start the audio capture. This is, for example, mobile phone 110 receiving a signal from the user to start capturing audio, as was described with reference to FIG. 1.

In step 312, a buffer begins capturing audio in response to the received signal to start the audio capture of step 310. This is, for example, buffer 116 of mobile phone 110 beginning to capture a user's spoken utterance received via microphone 112 of mobile phone 110, as was described with reference to FIG. 1.

In step 314, a signal is received to stop the audio capture. This is, for example, mobile phone 110 receiving a signal from the user to stop capturing audio, as was described with reference to FIG. 1.

In step 316, the buffer ends capturing audio in response to the received signal to end the audio capture of step 314. This is, for example, buffer 116 of mobile phone 110 ending capture of the user's spoken utterance received via microphone 112 of mobile phone 110, as was described with reference to FIG. 1.

In step 318, the captured audio is sent to an ASR system. This is, for example, mobile phone 110 sending the captured audio across network 130 to ASR system 150 of server 140, as was described with reference to FIG. 1.

In step 320, the ASR system recognizes the received audio. This is, for example, ASR system 150 performing speech recognition processing on the received audio, as was described with reference to FIG. 1.

In step 322, the recognized audio is received from the ASR system. This is, for example, mobile phone 110 receiving across network 130 from ASR system 150 the recognized form of the captured audio, as was described with reference to FIG. 1.

In step 324, the recognized audio is rendered to the user. This is, for example, mobile phone 110 rendering the received recognized form on mobile phone 110, as was described with reference to FIG. 1.

In step 326, following step 316, a wait period of a turnaround interval occurs. This is, for example, mobile phone 110 waiting the turnaround interval, as was described with reference to FIG. 1.

In step 328, audio is played back. This is, for example, mobile phone 110 playing back via loudspeaker 118 the audio captured in buffer 116.

It is to be understood that the sequence and timing of steps shown in FIG. 3 is merely exemplary. For example, the sending of audio to the ASR system of step 318, could begin any time after the buffer begins capturing audio in step 312. Similarly, the ASR system recognizing the audio in step 320 could begin before the end of the sending of audio to the ASR system of step 318. However, at least some overlap in time of the play back audio in step 328 and either the sending audio to ASR system in step 318, or the ASR system recognizing audio in step 320, or the receiving recognized audio from the ASR system in step 322, or all three of steps 318, 320 and 322, occurs in each of the various embodiments of the present invention. It is this overlap that is the masked latency and provides the user perceived apparent latency rather than the true latency.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, the description and the drawing should not be considered in a limiting sense, as it is understood that the present invention is in no way limited to only the embodiments illustrated.

Other embodiments use different utterance gating controls than the described push-to-talk switch for the signal to start audio capture and the signal to stop audio capture. For example, a push-to-start/push-again-to-stop button can be used, as can separate push-to-start and push-to-stop buttons. Alternatively, a push-to-start button only, with timeout or active processing of the received audio signal to determine the end-of-speech can be used to trigger the signal to stop audio capture, can be used. Further, the utterance gating control mechanism may be operated explicitly (e.g., by operation of one or more buttons as described) or implicitly (e.g., by the use of an accelerometer to sense a change in device orientation) to control the start and stop of the audio capture process.

Although described as a user device physically separate from the ASR system, the various components and processes described herein can be arranged in a large variety of alternative configurations. In one embodiment, each is combined into a single user device such s mobile phone 110 of FIG. 1. Alternatively, with adequate network communications, the buffer can be co-located with the ASR system such that both are located remotely from the other described components within the user device.

It is to be understood that network 130 of FIG. 1 can be any of a large variety of known network configurations including a local area network (LAN), a wide area network (WAN), a cellular or landline telephone network, etc., or any combination thereof. Similarly, server 140 can be any of a large variety of known server configurations including a network or communications server, a cellular phone server, an application server, etc., or any combination thereof.

It is likewise to be understood that the present approach is applicable to any of a large variety of applications capable of utilizing recognized speech input including but not limited to electronic mail (email), Internet message (IM) messaging, short message system (SMS) messaging, an Internet browser, etc., including one that uses the symbolic interpretation of the recognized speech to specify input for any of a large variety of purposes including a travel itinerary, for planning and ticketing of travel, arranging a rendezvous with a taxi, or vending of any other product or service.

What is claimed is:

1. An automatic speech recognition method comprising:
receiving from a user of a mobile phone a signal to start capturing a user spoken audio utterance;
begin capturing the user spoken audio utterance in a buffer of the mobile phone in response to the received signal to start capturing the user spoken audio utterance;
receiving from the user of the mobile phone a signal to stop capturing the user spoken audio utterance;
end capturing the user spoken audio utterance in the buffer of the mobile phone in response to the received signal to stop capturing the user spoken audio utterance;
and performing the following steps in sequence:
in a first step, begin sending the captured user spoken audio utterance from the buffer of the mobile phone to an automatic speech recognition system of a server located across a network from the mobile phone;
in a second step, begin playing back the captured user spoken audio utterance from the buffer of the mobile phone to the user while the captured user spoken audio utterance is being sent to and/or recognized by the automatic speech recognition system;
in a third step, receiving at the mobile phone a recognized version of the captured user spoken audio utterance from the automatic speech recognition system of the server located across the network from the mobile phone; and
in a fourth step, rendering at the mobile phone the recognized version of the captured user spoken audio utterance.

2. The method of claim 1 wherein the first step occurs before the end capturing the user spoken audio utterance in the buffer of the mobile phone.

3. The method of claim 1 wherein the first step occurs at the end capturing the user spoken audio utterance in the buffer of the mobile phone.

4. The method of claim 1 wherein the first step occurs after the end capturing the user spoken audio utterance in the buffer of the mobile phone.

5. The method of claim 1 wherein the second step occurs a predetermined period of time alter the end capturing the user spoken audio utterance in the buffer of the mobile phone.

6. The method of claim 5 wherein the predefined period of time is 100 milliseconds.

7. An apparatus comprising:
a microphone configured to receive audio from a user of the apparatus;
a buffer configured to store the received audio;
an utterance gating control configured to start and stop the buffer storing the received audio;
a loudspeaker;
and a processor configured to perform the following steps in sequence:
in a first step, begin sending the stored audio across a network to an automatic speech recognition system;
in a second step, after waiting a predefined period of time after the utterance gating control has stopped the buffer storing the received audio, control play back of the stored audio through the loudspeaker while the stored audio is being sent to and/or recognized by the automatic speech recognition system;
in a third step, receive across the network from the automatic speech recognition system a recognized version of the sent audio; and in a fourth step, render at the apparatus the received recognized version of the sent audio.

8. The apparatus of claim 7 wherein the apparatus is a mobile phone.

9. The apparatus of claim 7 wherein utterance gating control is a push-to-talk button.

10. The apparatus of claim 7 wherein the network is a cellular telephone network.

11. The apparatus of claim 7 wherein the network is the Internet.

12. A non-transitory-computer readable storage medium having embodied thereon a program, the program executable by a processor to perform a method for automatic speech recognition, the method comprising:

receiving from a user of a mobile phone a signal to start capturing a user spoken audio utterance;

begin capturing the user spoken audio utterance in a buffer of the mobile phone in response to the received signal to start capturing the user spoken audio utterance;

receiving from the user of the mobile phone a signal to stop capturing the user spoken audio utterance;

end capturing the user spoken audio utterance in the buffer of the mobile phone in response to the received signal to stop capturing the user spoken audio utterance;

and performing the following steps in sequence:

in a first step, begin sending the captured user spoken audio utterance from the buffer of the mobile phone to an automatic speech recognition system of a server located across a network from the mobile phone;

in a second step, begin playing back the captured user spoken audio utterance from the buffer of the mobile phone to the user while the captured user spoken audio utterance is being sent to and/or recognized by the automatic speech recognition system;

in a third step, receiving at the mobile phone a recognized version of the captured user spoken audio utterance from the automatic speech recognition system of the server located across the network from the mobile phone; and in a fourth step, rendering at the mobile phone the recognized version of the captured user spoken audio utterance.

13. The non-transitory computer readable storage medium of claim 12 wherein in the method the first step occurs before the end capturing the user spoken audio utterance in the buffer of the mobile phone.

14. The non-transitory computer readable storage medium of claim 12 wherein in the method the first step occurs at the end capturing the user spoken audio utterance in the buffer of the mobile phone.

15. The non-transitory computer readable storage medium of claim 12 wherein in the method the first step occurs after the end capturing the user spoken audio utterance in the buffer of the mobile phone.

16. The non-transitory computer readable storage medium of claim 12 wherein in the method the second step occurs a predetermined period of time after the end capturing the user spoken audio utterance in the buffer of the mobile phone.

* * * * *